United States Patent [19]

Geiger et al.

[11] 3,961,023
[45] June 1, 1976

[54] PROCESS FOR THE PRODUCTION OF CYANOGEN CHLORIDE AND HYDROGEN CHLORIDE

[75] Inventors: Friedhelm Geiger; Werner Heimberger; Gerd Schreyer, all of Hanau; Wolfgang Weigert, Offenbach, all of Germany

[73] Assignee: Deutsche Gold- und Silber-Scheideanstalt vormals Roessler, Germany

[22] Filed: Jan. 13, 1975

[21] Appl. No.: 540,706

[30] Foreign Application Priority Data

Jan. 12, 1974 Germany............................ 2401412

[52] U.S. Cl. .................................... 423/383; 55/71;
423/486; 260/564 R; 260/566 D
[51] Int. Cl.² .......................................... C01B 21/18
[58] Field of Search .......... 423/371, 379, 383, 481,
423/486; 55/71; 260/564 R, 566 D

[56] References Cited
UNITED STATES PATENTS

| | | | |
|---|---|---|---|
| 3,618,295 | 11/1971 | Geiger et al. ............................ | 55/71 |
| 3,839,543 | 10/1974 | Geiger et al. ........................ | 423/379 |

Primary Examiner—Earl C. Thomas
Attorney, Agent, or Firm—Cushman, Darby & Cushman

[57] ABSTRACT

Cyanogen chloride and hydrogen chloride are produced by reacting hydrogen cyanide and chlorine, separating from the gaseous mixture on the one hand hydrogen chloride and on the other hand cyanogen chloride which in a given case can also contain chlorine, by absorption in a halohydrocarbon which has a boiling point between that of cyanogen chloride and cyanuric chloride and after distillative separation of the dissolved cyanogen chloride-chlorine mixture returning the solvent to the absorption column, the process includes a. adding as the solvent for the absorption a trifluoromethyl substituted aromatic hydrocarbon or halohydrocarbon or a mixture of such trifluoromethyl substituted aromatic hydrocarbons or halohydrocarbons, b. subjecting the gas mixture consisting of cyanogen chloride, hydrogen chloride and in a given case chlorine after leaving the reactor for the chlorination of hydrogen cyanide and before entrance into the absorption column to a pretreatment with the solvents set forth under (a) at a temperature between 80°C. and the boiling point of the solvent and/or c. either converting the N-chloro-chloroformimide chloride formed in small amounts from the chlorine and cyanogen chloride in the course of the absorption and distillation into the insoluble chloroformimide chloride hydrochloride by gassing the solvent with hydrogen chloride and separating the insoluble hydrochloride in conventional manner and/or withdrawing the N-chloro-chloroformimide together with some cyanogen chloride and solvent of the previously named distillation column for separation of the cyanogen chloride by means of a side outlet, and in a second subsequently provided distillation column separating into solvent and pure N-chloro-chloroformimide chloride, whereby then the latter can be conducted both into the cyanogen chloride reactor and also, if connected to a plant for the production of cyanuric chloride, into the trimerization reactor for cyanogen chloride and/or d. subjecting the solvent contaminated with byproducts by the suspension resulting from the pretreatment and/or accumulating in the sump of the distillation column for the separation of the cyanogen chloride completely or in a partial stream to an aqueous alkaline treatment or in combination with a cyanuric chloride condensation plant leading the suspension formed in the pretreatment to the cyanuric chloride condensation column.

18 Claims, 5 Drawing Figures

PROCESS FOR THE PRODUCTION OF CYANOGEN CHLORIDE AND HYDROGEN CHLORIDE

It is known to produce cyanogen chloride by reaction of hydrogen cyanide with chlorine in the gas phase. The reaction takes place in the presence of surface active catalysts such as activated carbon (Chem. Abst. Vol. 15 (1921) page 2593) or graphite (Belgian Pat. No. 779,690 or corresponding Geiger U.S. Pat. No. 3,839,543.

The gaseous mixture resulting from the reaction which in the main consists of cyanogen chloride, hydrogen chloride and perhaps excess chlorine can in likewise known manner according to German Pat. No. 1,809,607 and corresponding Geiger U.S. Pat. No. 3,618,295 be so separated with the help of a continuously circulating process using a halogenated hydrocarbon such as hexachlorobutadiene, for example, by absorption and subsequent distillation that pure hydrogen chloride, as well as cyanogen chloride, which in a given case can contain chlorine, are recovered as the reaction products.

However, it has been shown in the carrying out of the last named process over a long period of time that depending on the impurities in the starting chlorine and hydrogen cyanide as well as dependent upon the favorability of reaction of the final products cyanogen chloride and hydrogen chloride, the circulating solution becomes enriched with a number of by-products with increasing time. Although these by-products occur only in small amounts they so negatively influence the absorption capability of the solvents used for cyanogen chloride and, in a given case, chlorine, that the separation of cyanogen chloride and hydrogen chloride by absorption and subsequent distillation is uneconomical. Furthermore the chlorine and cyanogen chloride reaction products existing in the solution and which are to be separated as well as the by-products can further react, so that they clog the absorption columns, the distillation columns, the pipe lines and the heat exchanger with unsoluble solids and make it impossible to continuously carry out the separation of cyanogen chloride and hydrogen chloride.

As by-products there can occur phosgene, carbamyl chloride, cyanuric acid, cyanuric chloride, ammonium chloride, N-chloro-chloroformimide chloride as well as other materials of unknown constitution, however, in part provable gas chromatographically. The cyanogen chloride besides is contaminated by the occurrence of volatile impurities such as phosgene and can no longer be used without further purification steps for the production of cyanogen chloride through trimerization or for the reaction of N,N'-diphenyl guanidine by reaction with aniline.

There have already been tried experiments by the present inventors to avoid the formation of by-products during the formation of the cyanogen chloride by application of hydrogen cyanide having a water content of ≦ 0.01 weight %. It has also been tried to prevent the formation of cyanuric chloride and additional by-products in the circulating solvent by application of a $FeCl_3$ free chlorine gas according to German Pat. Nos. P 22 15942.8-41 and P 2262267.9-41 and Geiger U.S. Application Ser. No. 346,789 filed Apr. 2, 1973 which combines the disclosure of the two German patents. However, in carrying out the process under industrial conditions it has been found that while the formation of by-products is prevented, in the long run they cannot be avoided so that here also there occurs an increase in by-products with time in the circulating solution and subsequently the already described disturbances occur.

It has now been found that all disturbing by-products formed directly or in the course of time through secondary reactions in using water containing hydrogen cyanide in several months operation can be removed if cyanogen chloride and hydrogen chloride are produced by reacting hydrogen cyanide and chlorine, separating from the gaseous mixture on the one hand hydrogen chloride and on the other hand cyanogen chloride, which in a given case can also contain chlorine, by absorption in a halohydrocarbon which has a boiling point between that of cyanogen chloride and cyanuric chloride and after distillative separation of the dissolved cyanogen chloride-chlorine mixture returning the solvent to the absorption column, the process includes a. adding as the solvent for the absorption a trifluoromethyl substituted aromatic hydrocarbon or halohydrocarbon or a mixture of such trifluoromethyl substituted aromatic hydrocarbons or halohydrocarbons, b. subjecting the gas mixture consisting of cyanogen chloride, hydrogen chloride and in a given case chlorine after leaving the reactor for the chlorination of hydrogen cyanide and before entrance into the absorption column to a pretreatment with the solvents set forth under (a) at a temperature between 80°C. and the boiling point of the solvent and/or c. either converting the N-chloro-chloroformimide chloride formed in small amounts from the chlorine and cyanogen chloride in the course of the absorption and distillation into the insoluble chloroformimide chloride hydrochloride by gassing the solvent with hydrogen chloride and separating the insoluble hydrochloride in conventional manner and/or withdrawing the N-chloro-chloroformimide together with some cyanogen chloride and solvent of the previously named distillation column for separation of the cyanogen chloride by means of a side outlet, and in a second subsequently provided distillation column separating into solvent and pure N-chloro-chloroformimide chloride, whereby then the latter can be conducted both into the cyanogen chloride reactor and also, if connected to a plant for the production of cyanuric chloride, into the trimerization reactor for cyanogen chloride and/or d. subjecting the suspension from the pretreatment and/or the solvent contaminated with by-products accumulating in the sump of the distillation column for the separation of the cyanogen chloride completely or in a partial stream to an aqueous alkaline treatment or in combination with a cyanuric chloride condensation plant leading the suspension formed in the pretreatment to the cyanuric chloride condensation column.

As trifluoromethyl group substituted aromatics there is meant hexafluoroxylene (bis(trifluoromethyl)benzene), (o, m and p isomers), trifluoromethyl benzene or nuclear halogenated benzotrifluorides such as chloro-benzotrifluoride, e.g., p-chlorobenzotrifluoride, o-chloro-benzotrifluoride, and m-chloro-benzotrifluoride, m-bromo-benzotrifluoride, m-fluoro-benzotrifluoride or mixtures of these materials. Especially preferred are m-chlorobenzotrifluoride and m-hexafluoroxylene as well as mixtures of these two compounds.

To be sure it is known according to German Pat. No. 1,809,607 and Geiger U.S. Pat. No. 3,618,295 to use halogenated hydrocarbons for the separation of gas mixtures of cyanogen chloride and hydrogen chloride which arise through reaction of chlorine and hydrogen cyanide. There is no mention, however, of the use of trifluoromethyl aromatic hydrocarbons or trifluoromethyl haloaromatic hydrocarbons.

However, it has been proven in the carrying out of the circulatory process over a long period of time that all of the operations performed according to the invention, especially the purification operations can be carried out without difficulty using the likewise named solvents of the invention, since only by their using is emulsion formation avoided and only they are fully inert against a simultaneous action of chlorine, cyanogen chloride, hydrogen chloride, cyanuric chloride and N-chloro-chloroformimide, as well as against aqueous alkalis and simultaneously possess a sufficient dissolving power for cyanogen chloride, chlorine, cyanuric chloride and N-chloro-chloroformimide chloride.

As alkaline reacting aqueous media for the treatment of the distillate or in the pretreatment of formed suspensions there can be used aqueous solutions of alkalis or alkaline earths. These include alkaline acting sodium, potassium, magnesium and calcium compounds for example, as well as strontium, barium and lithium compounds. They can be used in the form of their hydroxides, e.g., sodium hydroxide, potassium hydroxide, calcium hydroxide, strontium hydroxide, barium hydroxide, lithium hydroxide or their alkaline reacting salts such as carbonates or acetates, e.g., sodium carbonate, potassium carbonate, lithium carbonate, sodium acetate, potassium acetate, lithium acetate, calcium acetates magnesium acetate, barium acetate or strontium acetate so long as they are sufficiently water soluble. Especially preferred are the alkali hydroxides. In the alkaline treatment the by-products as such or in the form of their saponification products go over into the aqueous phase and can be removed by phase separation from the organic solvent.

In the alkaline treatment the organic phase resulting after the phase separation contains some water. The water is in emulsified form. This emulsion can be broken by leading the organic phase through conventional solid emulsion breakers, above all others silica. In a separator arranged after the emulsion breaker the organic phase is then quantitatively separated from the aqueous phase. Generally it is not necessary to dry the recovered solvent.

The treatment with the alkalis which can be added both as a saturated aqueous solution and also down to about 1 weight % takes place in known manner in stirred vessels or in extraction columns or corresponding apparatuses. The use of more dilute alkalis than 1 weight % is possible in principle but has no advantage. The temperatures used can be from 0° to 100°C., preferably 40°–80°C. The temperature range is not critical.

As already stated by using the present process for the production of cyanogen chloride there can be added a hydrogen cyanide with a proportionately high water content. Preferably, however, there is used a commercial hydrogen cyanide with a water content of 0.005 to 1.0 weight %.

The purification operation can be carried out eoither discontinuously or continuously. Besides it is possible to treat both the total circulating solution or only a partial stream according to the named procedure. Preferably a partial stream is treated.

As distillation and absorption apparatuses there are suitable all of the customary columns with packing or corresponding installations. The pressure is not critical for the separation of the cyanogen chloride — hydrogen chloride mixture as well as for the stripping of the solvent and the purification operation. All operating steps can be carried out at 0.5 to 3 atmospheres (absolute pressure), preferably, however, operation is in the neighborhood of atmospheric pressure (760mm). The absorption can be carried out at −20 to +60°C., preferably at temperatures of −20 to +40°C.

It is known that in the production of cyanogen chloride using a benzene containing hydrogen cyanide, which occurs in the production of acrylonitrile according to the Sohio process there is obtained a cyanogen chloride that poisons the activated carbon catalyst in a short time in a subsequent trimerization.

An especial advantage of the present invention therefore is that for the production of cyanogen chloride there can even be used directly a hydrogen cyanide with a benzene content of 5,000 ppm without any expensive purification (such as that shown in German Pat. Nos. 1,271,091 and 1,282,625 and Schreyer U.S. Pat. No. 3,488,919. Even after several months operation in a subsequently provided cyanogen chloride trimerization unit no reduction in the activated carbon catalyst activity was observed. The technical advance of the process of the invention is first in the recovery of pure hydrogen chloride in practically quantitative yield and secondly in the disturbance free, continuous recovery of cyanogen chloride through production of a very pure, by-product free cyanogen chloride on an industrial scale using a hydrogen cyanide which can contain 0.005 to 2 weight % water as well as up to 5,000 ppm of benzene, e.g., 1,500 to 5000 ppm. No ascertainable poisoning of the activated carbon catalyst in the subsequently provided cyanogen chloride trimerization reactor occurs through this cyanogen chloride.

The invention will be understood best in connection with the drawings wherein.

In the drawings like numbers refer to like parts.

Unless otherwise indicated all parts and percentages are by weight.

EXAMPLE 1

Figure 1:
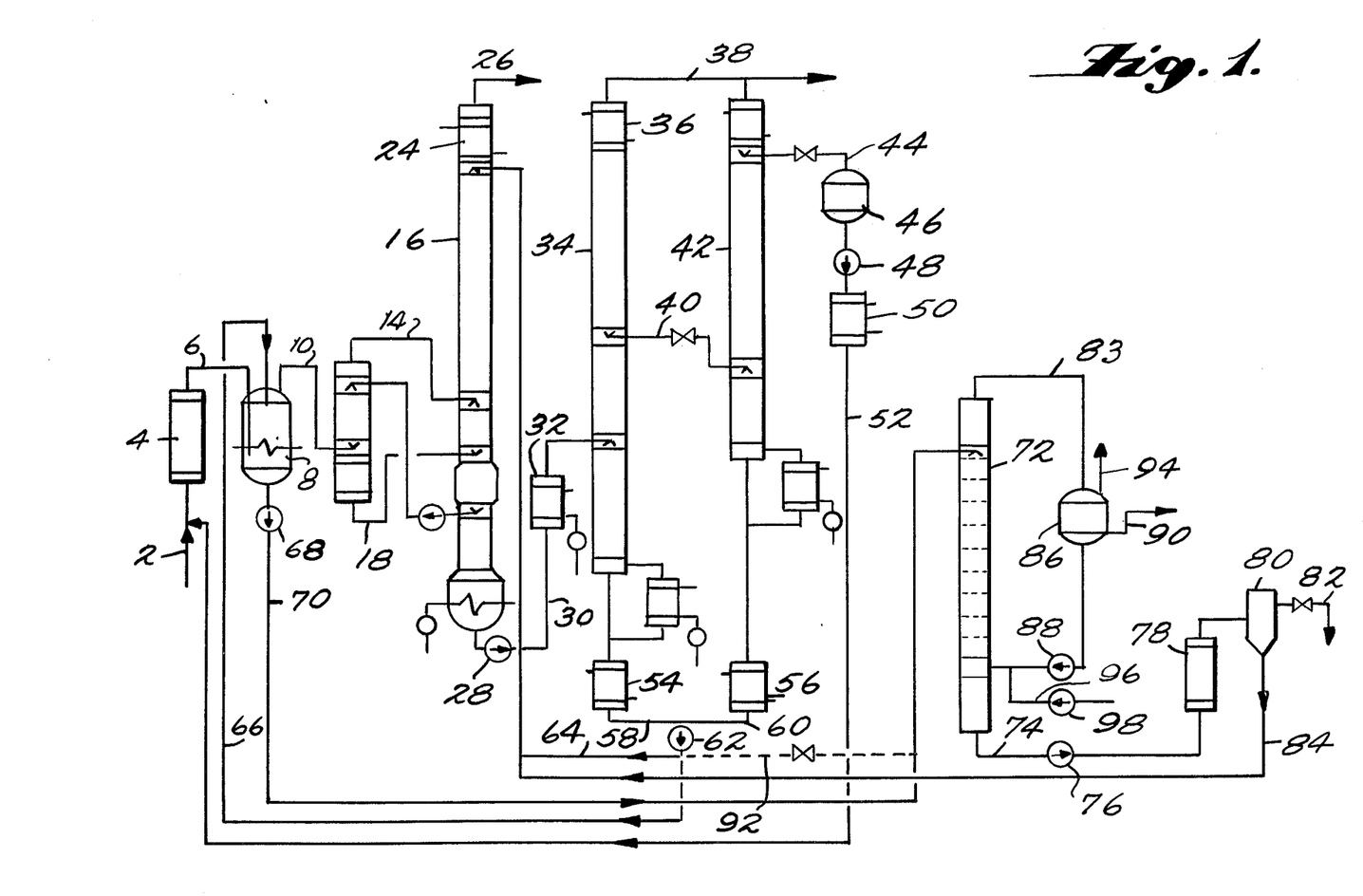
FIG. 1 is a schematic representation of an apparatus for carrying out the process of the invention.

Employing the apparatus of FIG. 1 a mixture of 1.1 kg/h of hydrogen cyanide gas with a water content of 0.5% weight % as well as a benzene content of 0.15 weight % and 3.0 kg/h of chlorine gas washed free of iron (III) chloride was led over line 2 into the reactor 4. The reactor contained as a catalyst graphite particles. The reaction to form cyanogen chloride and hydrogen chloride was carried out at 450°–500°C. The exhaust gases from the reactor were introduced via line 6 into washer 8 for the pretreatment and contacted with m-chlorobenzotrifluoride having a temperature of 120°C. The washed reactor exhaust gases by way of line 10 next arrived at the quench unit 12 where they were cooled to 20°C and subsequently via line 14 into the absorption column 16, where there occurred the separation of the hydrogen chloride through absorption of the cyanogen chloride and the excess chlorine in m-chlorobenzotrifluoride as solvent.

The quench unit 12 is so connected that with the help of lines 18 and 20 as well as pump 22 there takes place a continuous solvent exchange between the quench unit 12 and the absorption column 16.

The escaping hydrogen chloride at the head of the absorption column freed from the portion of entrained solvent by an intensive condenser 24 and leaves the system via line 26.

The sump of the absorption column 16 was heated to about 65°C in order to completely remove the hydrogen chloride from the absorption solution.

The absorption solution containing about 5 weight % of Cyanogen Chloride goes by way of the pump 28, the line 30 and the preheater 32 to the distillation column 34, where a distillative separation into chlorine containing cyanogen chloride and solvent occurs.

The head of the distillation column 34 is provided with a dephlegmator 36 where the chlorine containing cyanogen chloride (2.59 kg/h) was drawn off via the line 38. With the help of a side outlet there was drawn off from the distillation column 34 via the line 40 a small amount (average 12.19 g/h) of a liquid which consists of 85–89 weight % of N-chloro-chloroformimide chloride, 4–8 weight % m-chlorobenzotrifluoride and 4–8 weight % cyanogen chloride. The liquid mixture was led to column 42 where a distillative separation took place into cyanogen chloride containing N-chloro-chloroformimide chloride and m-chlorobenzotrifluoride. The N-chloro-chloroformimide chloride containing cyanogen chloride was drawn off as a liquid at the head of the column via line 44 and compressed via the receiver 46 with the help of the pump 48 into evaporator 50. The vapor form mixture was recycled via line 52 into the cyanogen chloride reactor 4.

The m-chlorobenzotrifluoride accumulating in the sumps of distillation columns 34 and 42 was cooled in condensers 54 and 56 to 18°–20°C. and collected via lines 58 and 60. With the help of the pump 62 the greatest part of the solvent was directly recycled to the head of the absorption column 16 via the line 64 while a smaller part was led via the line 66 to the hot washer 8.

The by-products separated in hot washer 8 were led in the form of a suspension in m-chlorobenzotrifluoride with the help of pump 68 via line 70 to the extraction column 72 (pulsating column) where the undesired by-products were removed from the solution through a countercurrent extraction at 60°C, with the help of aqueous soda lye. The solvent accumulating in the sump of extraction column 72 still contains small amounts of emulsified water and therefore is led via the line 74 and pump 76 to the silica tower 78 where the emulsion is broken. The separating water is separated off with the help of the separator 80 and line 82 and subsequently the pure solvent without further treatment recycled via the line 84 to the head of the absorption column 16. The soda lye used as the extraction agent was led into the cycle via the line 83 the intermediate vessel 86 and the pump 88 and through supplying fresh 10 weight % soda lye, via line 96 with the help of pump 98 so that the soda lye led in the cycle always has a content of $\leq$ 1 weight % of NaOH. The exhausted soda lye is withdrawn via line 90. There is consumed hourly 20–30 grams of caustic soda.

Should the disturbing by-products be enriched in the absorption — distillation cycle through a malfunctioning then a quick purification of the recycling solution can be attained via line 92.

After an unbroken operation of 12 weeks the run was still completely trouble free. There could not be ascertained the slightest deactivation of the activated carbon catalyst in a subsequently provided reactor for the trimerization of cyanogen chloride during the entire period of operation. However, since the benzene entrained with the hydrogen cyanide slowly becomes enriched in the solvent in the form of 1,2-dichlorobenzene, 1,2,4-trichlorobenzene and higher chlorinated benzenes, the solvent must be distillatively depleted of the halobenzenes continuously in a small partial stream or discontinously from time to time.

In combination with a cyanuric chloride-liquefaction plant the solvent extracted with soda lye also can be exchanged against solvent from the liquefaction plant.

The N-chloro-chloroformimide chloride separated by distillation can also be directly led into a reactor for the trimerization of the cyanogen chloride.

EXAMPLE 2

The procedure of example 1 (FIG. 1) was used except in place of the 10% soda lye there was used a 5% aqueous solution of sodium carbonate and ventilated via line 94 (FIG. 1), then this process also ran for 8 weeks of operation completely trouble free. The hourly consumption of $Na_2CO_3$ (100%) amounted to 26–40 grams.

EXAMPLE 3

The procedure of Example 1 (FIG. 1) was used except that in place of 10% soda lye there was used a 10% aqueous solution of potassium bicarbonate and ventilated via line 94 (FIG. 1). The process ran for 8 weeks, still completely free of trouble. The hourly consumption of $KHCO_3$ (100%) amounted to 50–85 grams.

EXAMPLE 4

The procedure of Example 1 (FIG. 1) was used except that in place of the pulsating column 72 there was employed a vessel with a rapidly running stirrer as well as a subsequently connected phase separation vessel. The process ran for 6 weeks of unbroken operation still completely free of trouble. The hourly consumption of caustic alkali amounted to 20–35 grams.

EXAMPLE 5

The procedure of Example 1 was followed, but the N-chloro-chloroformimide chloride formed in small amounts in the cycle from cyanogen chloride and chlorine was not removed by distillation but by gassing with hydrogen chloride.

Figure 2:
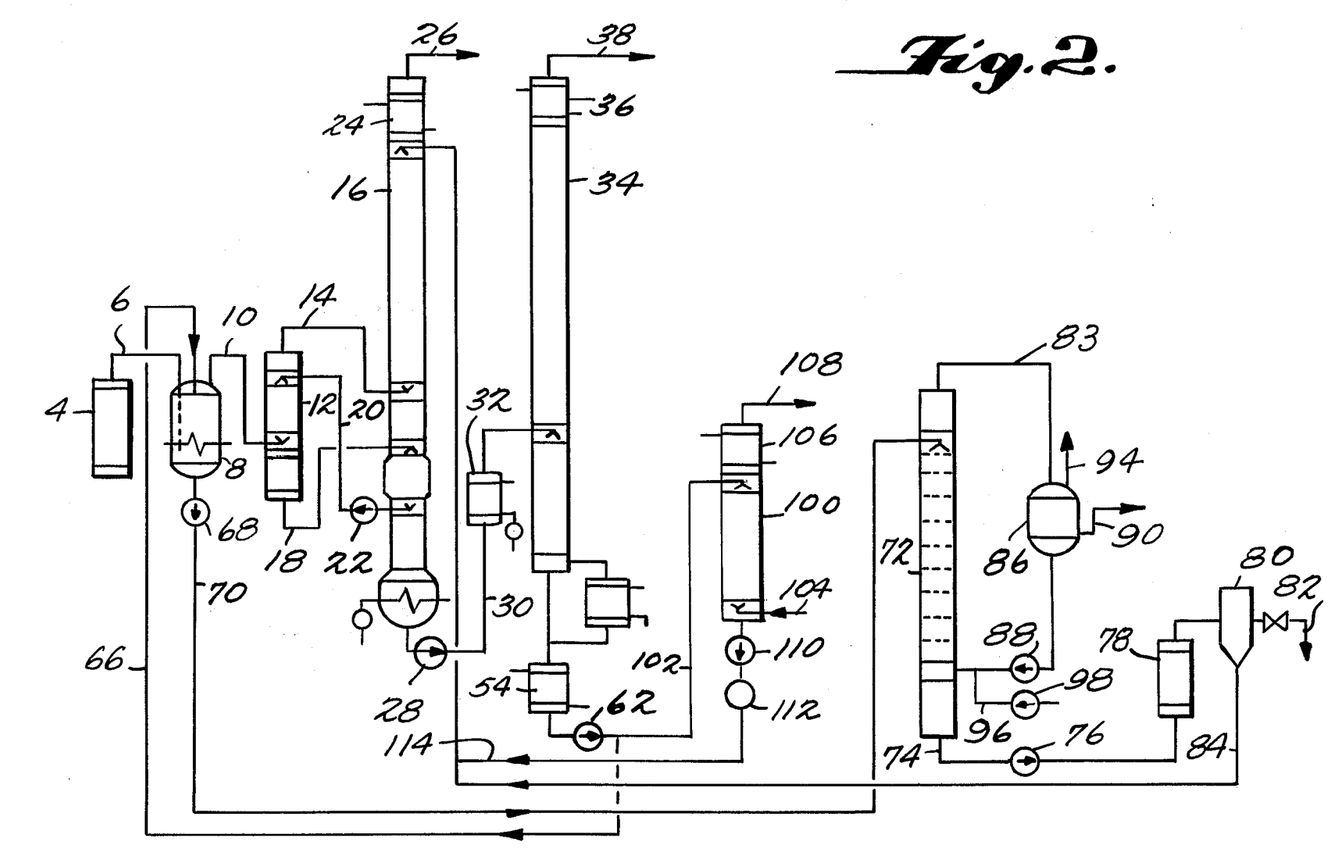
FIG. 2 is a schematic representation of an alternative apparatus for carrying out the process of the invention.

The solvent accumulating in the sump of column 34 (FIG. 2) was cooled in the condenser 54 to 18–20°C and the greatest part pumped into the gassing column 100 via line 102 while a smaller part was pumped via line 66 directly into the hot washer 8. So much hydrogen chloride was introduced via line 104 that the solvent m-chlorobenzotrifluoride found in the column is always saturated with hydrogen chloride. The excess, escaping hydrogen chloride, is freed from the entrained solvent portion at the head of the gassing column 100 by an intensive condenser 106 and is led off via line 108. The suspension occurring in column 100 because of the formation of the insoluble chloroformimide chloride hydrochloride is pumped with the pump 110 over the filter 112 where the chloroformimide chloride hydrochloride is removed as a crystalline white filter cake. The clear solution is recycled via line 114 to the head of absorption column 16.

The process is otherwise the same as that described in Example 1,

After 8 weeks of unbroken operation the process still ran completely free of trouble.

EXAMPLE 6 (Comparison Example)

Figure 3:
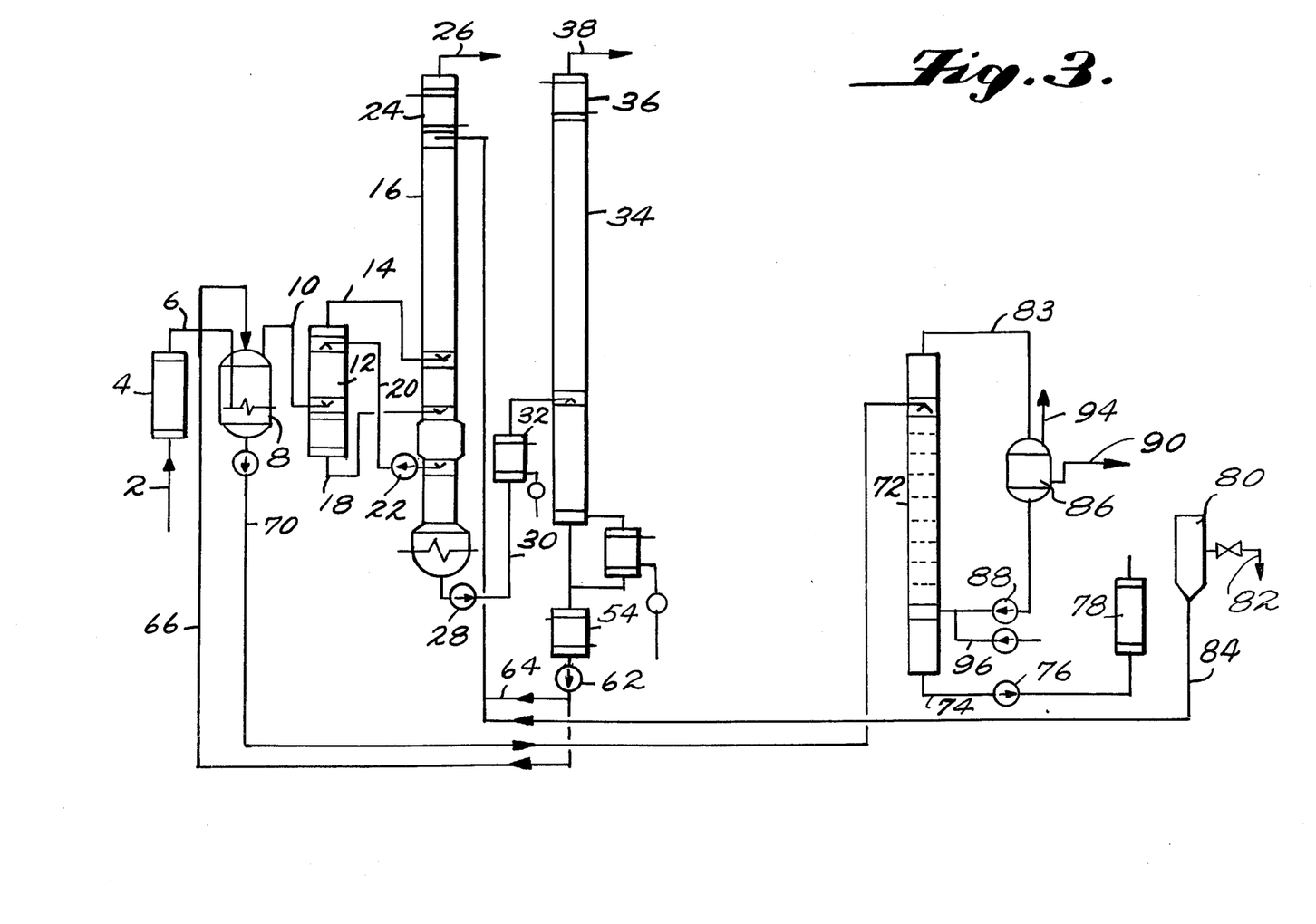
FIGS. 3, 4 and 5 are schematic representations of apparatus used in certain comparison processes.

Operating as in Examples 1 or 5 but according to FIG. 3 and giving up the separation of the N-chloro-chloroformimide chloride from the cycling solvent by distillation (Example 1) or hydrogen chloride gassing (Example 5) and instead recycling the greatest part of the solvent accumulating in the sump of distillation column 34 after cooling to 18–20°C. in condenser 54 with the help of pump 62 and line 64 directly to the head of absorption column 16, while a smaller partial stream is led via line 66 into the hot washer 8, then in the course of 3 weeks the upper charging area of absorption column 16 clogs with insoluble chloroformimide chloride hydrochloride. The plant must be taken out of operation and cleaned.

EXAMPLE 7 (Comparison Example)

Figure 4:
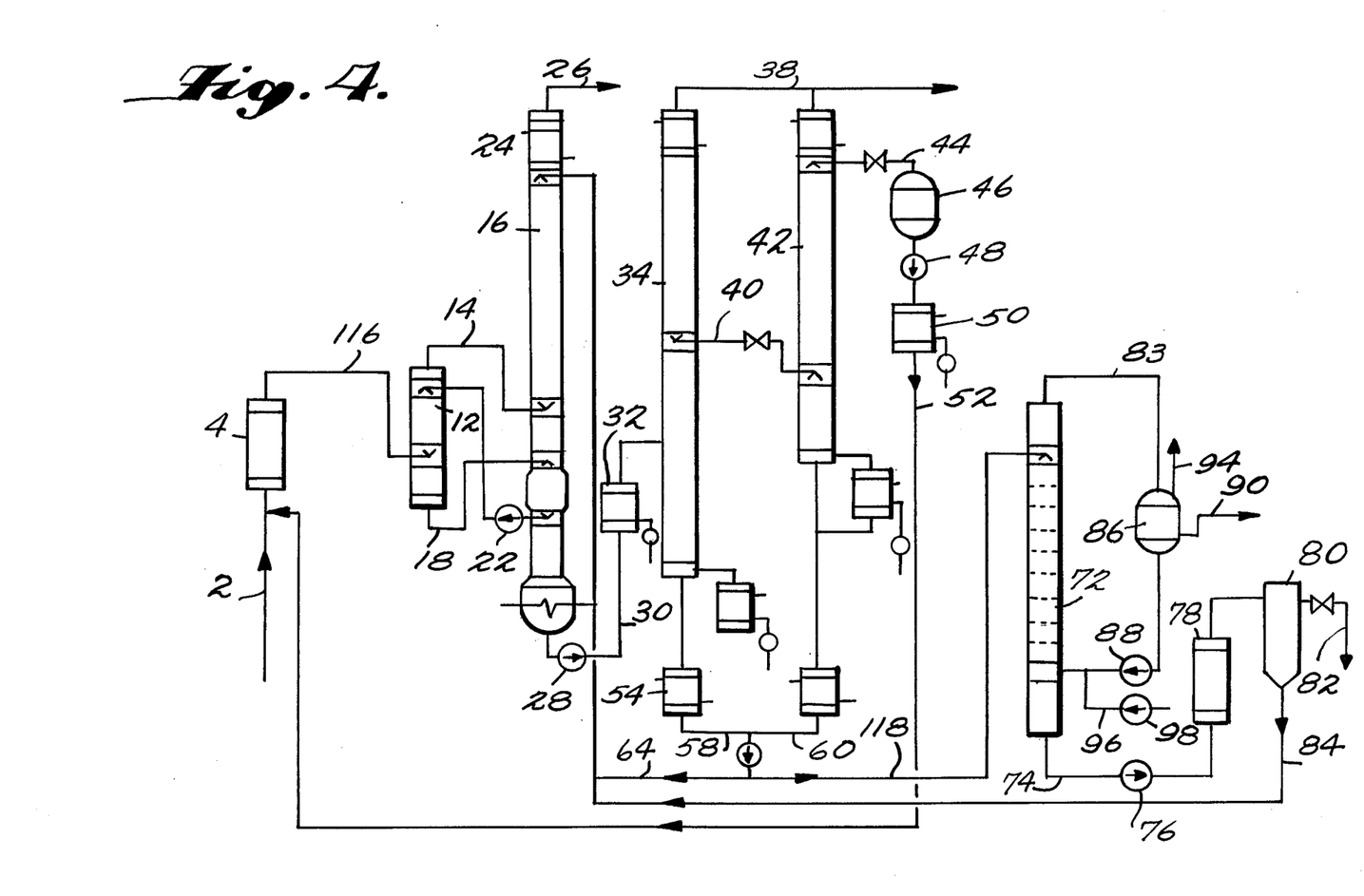

Operating as in Example 1 but according to FIG. 4 and giving up the pretreatment of the exhaust gases from reactor 4 with m-chlorobenzotrifluoride and the exhaust gases from the reactor were led via line 116 directly into the quench unit 12. In the course of 15 days operation both the quench unit 12 and the parts of absorption column 16 directly connected to the quench unit were clogged with insoluble compounds. The plant had to be taken out of operation and cleaned.

EXAMPLE 8 (Comparison Example)

Figure 5:
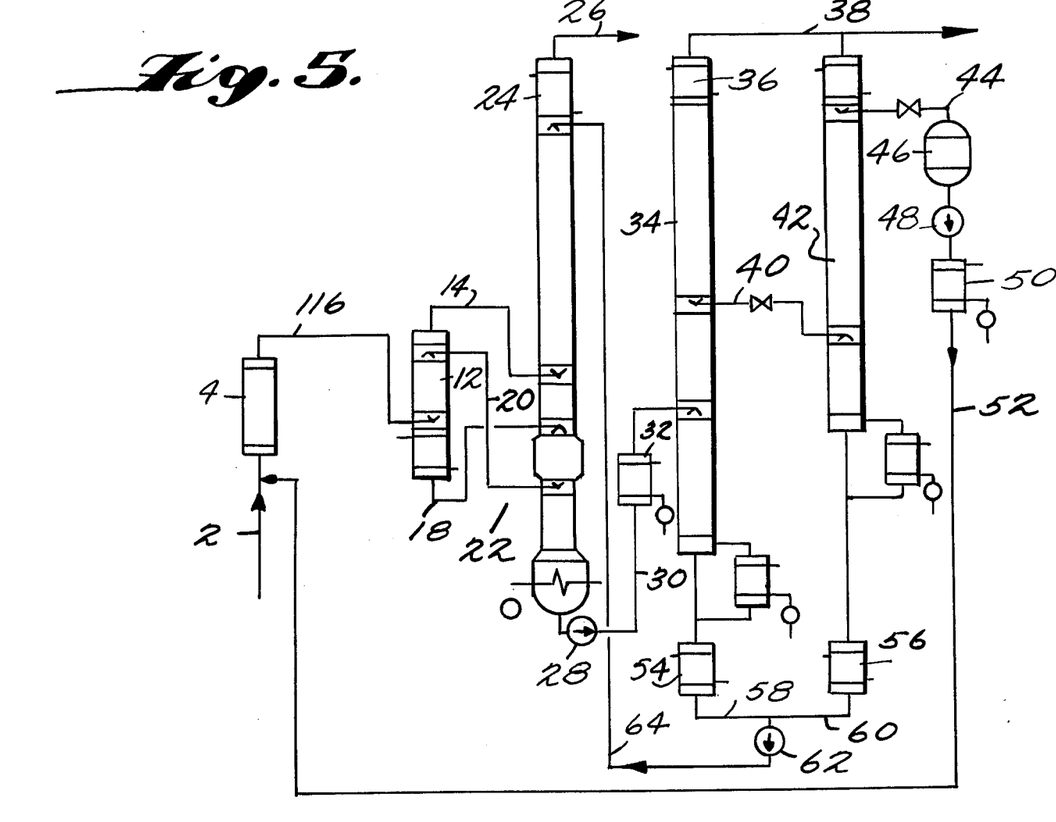

Operating as in Example 1 but according to FIG. 5 and giving up both the hot washing of the exhaust gases from reactor 4 and the treatment of the circulating solvent with aqueous alkali while the exhaust gases from reactor 4 were led via line 116 directly into the quench unit 12 and directly to the head of the absorption column 16 recycling the solvent freed from N-chloro-chloroformimide chloride accumulating in the sumps of distillation columns 34 and 42 after cooling in the condensers 54 and 56 via lines 58, 60 and 64 with the help of pump 62, there appeared in the quench unit 12, in the absorption column 16 and in the distillation column 34 deposits of insoluble compounds. Besides the cyanogen chloride withdrawn from the distillation column 34 contained phosgene. After about 10 days of operation the production of cyanogen and hydrogen chloride had to be interrupted and the entire plant purified.

The process can comprise, consist essentially of, or consist of the steps set forth.

We claim:

1. In a process for producing cyanogen chloride and hydrogen chloride by reacting hydrogen cyanide and chlorine, separating from the gaseous mixture (1) hydrogen chloride and (2) either cyanogen chloride or a mixture of cyanogen chloride and chlorine by absorbing (2) in a halohydrocarbon solvent which has a boiling point between that of cyanogen chloride and cyanuric chloride, separating the dissolved (2) from the solvent by distillation of (2) in a column and returning the solvent to the absorption apparatus the improvement comprising employing as the solvent for the absorption a trifluoromethyl aromatic hydrocarbon or trifluoromethyl haloaromatic hydrocarbon.

2. The process of claim 1 wherein the solvent is hexafluoroxylene or nuclear halogenated benzotrifluoride.

3. The process of claim 2 wherein the solvent is m-chlorobenzotrifluoride or m-hexafluoroxylene.

4. The process of claim 3 wherein the solvent is m-chlorobenzotrifluoride.

5. The process of claim 1 including the step of pretreating the mixture of (1) and (2) after leaving the reactor for the chlorination of hydrogen cyanide and before entering the absorption unit to a pretreatment with said solvent at a temperature between 80°C and the boiling point of the solvent.

6. The process of claim 5 wherein the solvent is hexafluoroxylene or nuclear halogenated benzotrifluoride.

7. The process of claim 5 wherein there is formed an aqueous phase and an organic phase in the treatment with the alkaline material and the organic phase resulting from the alkaline treatment is passed through a solid emulsion breaker.

8. The process of claim 7 wherein the solid emulsion breaker is silica.

9. The process of claim 8 wherein the solvent is hexafluoroxylene or chlorobenzotrifluoride.

10. The process of claim 5 wherein N-chloro-chloroformimide chloride is formed as a byproduct by the reaction of chlorine and cyanogen chloride and is present in said solvent, said process including the step of converting the N-chloro-chloroformimide chloride into insoluble chloroformimide chloride hydrochloride by passing hydrogen chloride into the solvent and separating said insoluble hydrochloride from the solution.

11. The process according to claim 10 including the step of subjecting to an aqueous alkaline material at least a part of the suspension of byproducts in solvent (1) drawn off from at least one pretreatment unit and (2) drawn off from the sump of the distillation unit for separating cyanogen chloride from hydrogen chloride.

12. The process of claim 11 wherein the alkaline material is an alkali metal or alkaline with metal hydroxide or alkaline acting salt, said alkaline material having a concentration of from 1 weight % up to the saturation concentration.

13. The process of claim 5 wherein N-chloro-chloroformimide chloride is formed as a byproduct by the reaction of chlorine and cyanogen chloride and is present in said solvent, said process including the steps of withdrawing the N-chloro-chloroformimide chloride together with some cyanogen chloride and said solvent from the distillation column and in a second distillation separating said solvent from pure N-chloro-chloroformimide chloride.

14. The process of claim 5 wherein N-chloro-chloroformimide chloride is formed as a byproduct by the reaction of chlorine and cyanogen chloride and is present in said solvent, said process including the step of subjecting at least a part of the suspension of byproducts in said solvent drawn off from at least one pretreatment unit and the sump of the distillation unit for separating cyanogen chloride from hydrogen chloride to an aqueous alkaline material.

15. The process of claim 1 where N-chloro-chloroformimide chloride is formed as a byproduct by the reaction of chlorine and cyanogen chloride and is present in said solvent, said process including the step of converting the N-chloro-chloroformimide chloride into insoluble chloroformimide chloride hydrochloride by passing hydrogen chloride into the solvent and separating said insoluble hydrochloride from the solution.

16. The process of claim 1 wherein N-chloro-chloroformimide chloride is formed as a byproduct by the reaction of chlorine and cyanogen chloride and is present in said solvent, said process including the steps of withdrawing the N-chloro-chloroformimide chloride together with some cyanogen chloride and said solvent from the distillation column and in a second distillation separating said solvent from pure N-chloro-chloroformimide chloride.

17. The process of claim 1 wherein the absorption is carried out at −20° to +60°C.

18. The process of claim 17 wherein the temperature of the absorption is −20° to +40°C.

* * * * *